Feb. 15, 1944.   N. TITLESTAD ET AL   2,341,887
COOLING OF SULPHUR DIOXIDE GASES
Filed June 26, 1941
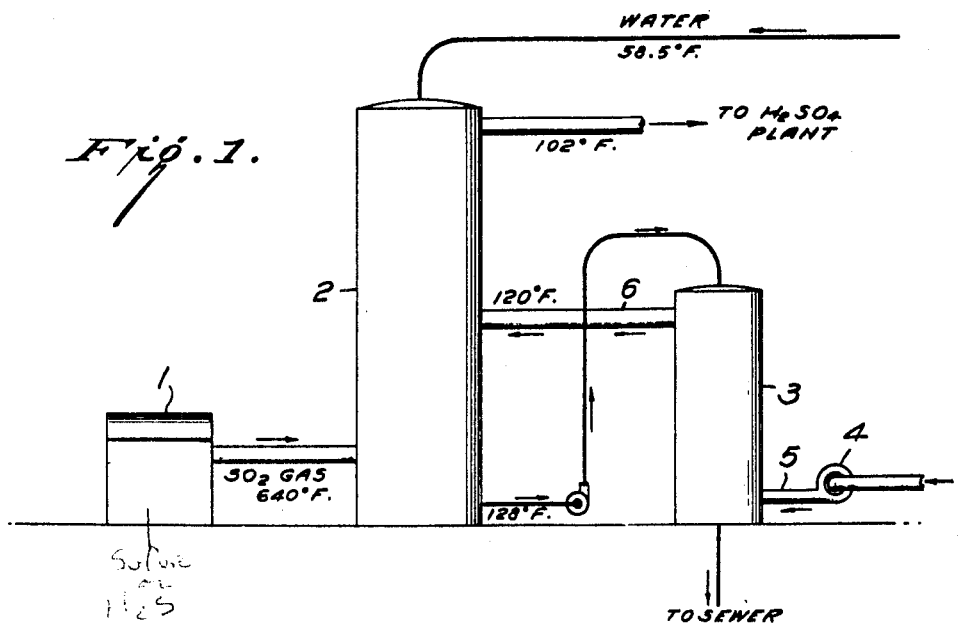
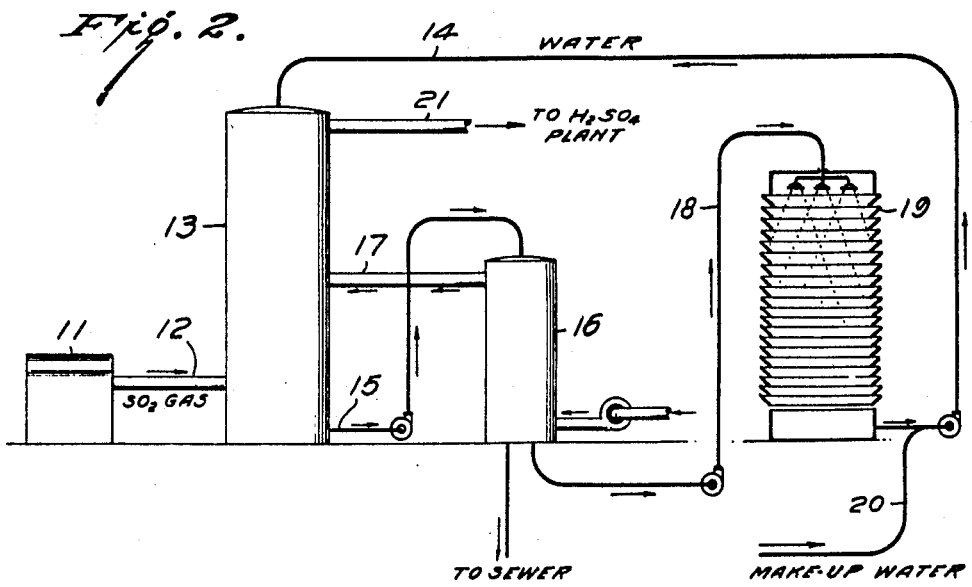
INVENTORS
NICOLAY TITLESTAD,
LOUIS N. ALLEN, JR.,
BY Wm. P. Spielman
ATTORNEY.

Patented Feb. 15, 1944

2,341,887

UNITED STATES PATENT OFFICE 2,341,887

COOLING OF SULPHUR DIOXIDE GASES

Nicolay Titlestad, White Plains, N. Y., and Louis N. Allen, Jr., Nutley, N. J., assignors to Chemical Construction Corporation, New York, N. Y., a corporation of Delaware Application June 26, 1941, Serial No. 399,786

2 Claims. (Cl. 23—177)

This invention relates to the cooling and dehydration of sulphur dioxide burner gases of the type that are obtained by the roasting of pyrites, the burning of sulphur or hydrogen sulphide, the thermal decomposition of ferrous sulphate or petroleum acid sludges and the like. A principal object of the invention is the provision of a method for washing burner gases of this type with a minimum loss of sulphur dioxide and in apparatus that is simple in construction and maintenance. A further object resides in the provision of a gas washing and cooling process in which the major portion of the wash water can be cooled and returned for reuse. Still further objects of the invention will be apparent from the following description of preferred modifications thereof, when taken with the appended claims.

In cooling hot sulphur dioxide gases it has heretofore been the practice to pass the gas through one or more towers over which cooling water containing more or less dissolved sulphur dioxide and sulphuric acid is recirculated. After each pass through the cooling tower this liquor has been cooled indirectly by means of cooling coils. However, this system will only operate efficiently when cooling water of relatively low temperature is available, since two temperature differences must necessarily be considered. These are (1) the temperature difference between the recirculating liquor and the sulphur dioxide gas and (2) the temperature difference between the recirculating liquor and the cooling water. For making 98% sulphuric acid, for instance, it is necessary to cool a 7% $SO_2$ gas down to approximately 95° F. and when oleum is required such a gas must be cooled below 90° F. as otherwise the gas will contain more water than can be used in oleum production. It is almost impossible to obtain these temperatures at the gas exit of the cooling tower if only cooling water of about 80–85° F. is available.

It has been previously proposed to cool the gases by direct water cooling, and to discharge the effluent liquor from the cooling tower directly into the sewer. This method, while useful where unlimited cooling water is available, entails a serious loss of sulphur dioxide and therefore of sulphuric acid, usually on the order of 5 to 10% of the total production of the plant.

Our present invention is based on a modification of the cooling system just described; that is, the system in which the gases are washed directly with a stream of cooling water. We have found that practically all of the sulphur dioxide content of this cooling water can be removed by passing it in countercurrent contact with a relatively small amount of air. We have also discovered that after being stripped of its sulphur dioxide content in this manner the wash water can be safely cooled by aeration, such as by natural draft or by blowing with further quantities of air, and then recirculated through the sulphur dioxide washing tower. The stripping air containing the sulphur dioxide removed from the cooling water may be mixed with the main stream of sulphur dioxide, preferably by introduction near the base of the cooling tower. By operating in accordance with the above principles of our invention it is easy to regulate the amount of cooling water entering the gas washing tower at a value satisfactory for adequate dehydration of the $SO_2$ gases after their passage through this tower. The sulphur dioxide gases leaving the washing tower are preferably passed through an electrostatic precipitator of the Cottrell type in order to remove mist and may then be passed directly to a contact sulphuric acid plant.

The invention will be illustrated in greater detail by reference to the accompanying drawing which illustrates diagrammatically the details of two preferred installations embodying the principles of the invention. On this drawing Fig. 1 illustrates a simple cooling system of the type that may be used when cooling water of relatively low temperature is available in amounts such that its reuse is unnecessary, while Fig. 2 represents a type of installation adapted for areas where cooling water of relatively high temperature must be employed. The data shown on the drawing is taken from installations using hydrogen sulphide as a source of sulphur dioxide, and provided with a waste heat boiler having stack temperatures of 600–900° C. It should be understood, however, that the invention in its broader aspects is not limited to the temperature or strength of the incoming sulphur dioxide gases, and that gases from any suitable source may be used when they do not contain large amounts of sulphur trioxide.

Referring to Fig. 1 of the drawing, reference numeral 1 indicates diagrammatically a hydrogen sulphide burner and waste heat boiler of a type now in commercial use for the combustion of hydrogen sulphide with air and the recovery of heat from the resulting sulphur dioxide gases. The sulphur dioxide gases leaving the waste heat boiler at a temperature of about 640° F. enter a gas washing tower 2, which may be of any suitable type such as an unpacked tower provided with a series of sprays. In the installation shown the sulphur dioxide gases entering near the base of this tower analyzed 9% sulphur dioxide when measured at 60° F. Cooling water at 58.5° F. was available at this location in large quantities and was supplied to the sprays of the tower in amounts such that the exit temperature of the $SO_2$ gases was 102° F. Because of the high sulphur dioxide content of the gases (9%) this temperature corresponds to the amount of water vapor to be retained in the gases for the subsequent manufacture of the desired sulphuric acid in this plant.

The cooling liquor drained from the base of the tower 2 contained 0.42% $SO_2$ and was heated in the tower to 128° F. This liquor was sprayed into the top of a small stripping tower 3, wherein it was passed in counter-current contact with a stream of air supplied by a pump 4 through a pipe 5 near the bottom of the tower. In the installation shown 417 cubic feet per minute of air were used and the actual conditions of measurement were: dry bulb temperature 78° F.; wet bulb temperature 72° F.; barometer corrected to 32° F.=29.28" of Hg. The sulphur dioxide-containing air leaving the top of the stripping tower 3 at a temperature of 120° F. was admitted through the pipe 6 into the gas washing tower 2 and mixed with the main stream of gases therein so that its sulphur dioxide content could be recovered without the necessity of a separate moisture removal. Obviously the same results would be obtained by mixing this air with the main stream of sulphur dioxide gases at any point ahead of the gas exit of the gas washing tower 2.

The stripped liquor obtained from the base of the stripping tower 3 amounted to 25 gallons per minute and had a temperature of 118° F. and a sulphur dioxide content of 0.005%, which was practically negligible. This liquor was discharged to the sewer since cooling water was plentiful at the location of the installation in question.

In the modification of Fig. 2, $SO_2$ gases from a sulphur or hydrogen sulphide burner 11 are admitted through pipe 12 to the base of a gas washing tower 13 which is similar in all respects to the tower 2 of Fig. 1. Cooling water of relatively high temperature as, for example, water of 90° F. is supplied through a line 14 to the sprays of this tower, and a sulphur dioxide liquor analyzing about 0.35–0.5% $SO_2$ is drained from the base of the tower through line 15. This liquor is pumped through sprays into the top of a stripping tower 16, similar to the tower 3, wherein it is aerated with a relatively small amount of air to remove its $SO_2$ content, the resulting $SO_2$-air mixture being admitted to the tower 13 through pipe 17.

A part of the heated liquor draining from the tower 16 may be discharged to the sewer, but the greater part is pumped through line 18 into the top of an aerating and cooling tower 19 wherein it is blown with air. This aeration results in the evaporation of a part of the water, and the cooling effect of this evaporation is sufficient to reduce the temperature of the remainder of the water to such a degree that, after admixture with make-up water introduced through the line 20, it has a temperature of approximately 90° F. and is suitable for reintroduction into the gas washing tower 13. By cooling and recirculating the wash water in this manner, a sulphur dioxide gas is obtained from the gas exit 21 of the tower 13 which is suitable for catalytic conversion to sulphur trioxide and absorption in strong sulphuric acid for the production of sulphuric acid monohydrate or oleum.

One of the principal advantages of the present invention resides in the cheapness and simplicity of the equipment in which it is practiced, as compared with the expensive acid coolers that were formerly employed. In the gas cooling systems heretofore employed it has been necessary to use acid-proof cooling coils for indirect cooling of the recirculating wash water, for the presence of substantial quantities of sulphur trioxide in the sulphur dioxide gases has resulted in the building up of substantial concentrations of sulphuric acid in these liquors. In practicing the present invention in the above-described equipment no cooling coils of this type are necessary, as the sulphur dioxide content of the wash water is recovered by aeration and the hot wash water may thereafter be discarded without serious loss of sulphur values. The present invention is particularly adapted for use in contact sulphuric acid plants of the type in which the sulphur dioxide gases are obtained by the combustion of hydrogen sulphide or by the decomposition of waste ferrous sulphate in admixture with carbonaceous material or iron pyrites, or both, in a rotary kiln, since a gas of relatively high sulphur dioxide content substantially free from sulphur trioxide is obtained from these sources.

What we claim is:

1. A method of cooling hot sulphur dioxide gases for use in the contact sulphuric acid process which comprises contacting a main stream of hot sulphur dioxide gases with cooling water, blowing the water from the cooling step with a small amount of air to remove sulphur dioxide dissolved therein, and mixing the resulting air-$SO_2$ mixture with the main stream of sulphur dioxide gases at a point where the latter is still in contact with the cooling water, the amount of cooling water being at least sufficient to condense all the excess moisture from the mixed gases over and above that quantity which will combine with the sulphur content thereof to form 98% sulphuric acid.

2. A method of cooling hot sulphur dioxide gases for use in the contact sulphuric acid process which comprises contacting a main stream of hot sulphur dioxide gases with cooling water, blowing the water from the cooling step with a small amount of air to remove sulphur dioxide dissolved therein, mixing the resulting air-$SO_2$ mixture with the main stream of sulphur dioxide gases at a point where the latter is still in contact with the cooling water, the amount of cooling water being at least sufficient to condense all the excess moisture from the mixed gases over and above that quantity which will combine with the sulphur content thereof to form 98% sulphuric acid, further aerating the purified cooling water to cool the same, and returning at least a part of the cooled and purified water to the gas cooling step.

NICOLAY TITLESTAD.
LOUIS N. ALLEN, Jr.